Patented May 4, 1954

2,677,694

UNITED STATES PATENT OFFICE 2,677,694

CONDENSATION PRODUCTS OF CHLORO-METHYLATED ARYLAMINOANTHRAQUI-NONES AND PHENOLS

David I. Randall, Easton, Pa., and Edgar E. Renfrew, Phillipsburg, N. J., assignors to General Aniline & Film Corporation, New York, N. Y., a corporation of Delaware No Drawing. Application April 17, 1951,
Serial No. 221,530

7 Claims. (Cl. 260—380)

This invention relates to novel condensation products of chloromethylated arylaminoanthraquinones containing no acidic water-solubilizing groups, with monocyclic phenols, the products being dyestuffs which are soluble in low molecular weight alcohols and ketones, but insoluble not only in water, but also in hydrocarbons and chlorinated hydrocarbons, especially of the type employed in dry cleaning.

In our copending application Serial No. 143,598, filed February 10, 1950, we have described the preparation of chloromethylated derivatives of arylaminoanthraquinones by reaction of a parent arylaminoanthraquinone compound, containing no acidic water-solubilizing groups, with bis-chloromethyl ether in concentrated sulfuric acid at moderate temperatues (e. g. 0° to 65° C.).

We have now discovered that the resulting chloromethylated products, described in the aforesaid copending application, can be condensed with monocyclic phenols having at least one of the positions ortho- and para- to an hydroxyl group unsubstituted, to form dyestuffs of high tinctorial strength and brilliance of shade which are soluble in low molecular weight alcohols and ketones, but insoluble in hydrocarbons, chlorinated hydrocarbons and water. The products are valuable for the coloration of lacquers, e. g. cellulose ester lacquers prepared with ketone or alcohol solvents, cellulose ester plastics, and cellulose ester textile materials. The insolubility of the novel compounds of the invention in hydrocarbons and chlorinated hydrocarbons renders the colorations produced thereby on the cellulose ester textiles highly resistant to dry cleaning.

It is an object of this invention to provide novel dyestuff compounds resulting from the aforesaid condensation and having the aforesaid properties, and to provide a process for their preparation.

In accordance with this invention, chloromethylated arylaminoanthraquinone compounds containing no acidic water-solubilizing groups, such as carboxylic or sulfonic acid groups (in free acid or neutral salt form), prepared, for example, as described in the aforesaid copending application, are heated with a monocyclic phenol, likewise free of acidic water-solubilizing groups, and having at least one of the positions ortho- and para- to an hydroxyl group unsubstituted, at temperatures from 100° to 200° C. until evolution of hydrogen chloride, produced by resulting condensation, comes to an end. No alkylation catalyst is employed in the reaction. Inert high boiling organic solvents can be employed in the reaction mixture, but preferably the condensation is effected in the presence of a substantial excess of the reagent phenol, which thereby serves as the reaction medium, without inclusion of other materials. In general, the reaction is complete under these conditions in 1 to 5 hours. The resulting condensation product can be isolated from the reaction mixture by dissolving the excess phenol in water or aqueous alcohol, and recovering the precipitated dyestuff by filtration. If desired, the last portion of the phenol can be removed by washing or steam distillation.

Chloromethylated arylaminoanthraquinone compounds serving as intermediates for the process of this invention are prepared by chloromethylating arylaminoanthraquinone compounds, preferably mononuclear arylaminoanthraquinones in which the number of arylamino groups generally ranges from 1 to 4, and in which at least one of the arylamino groups preferably occupies an $\alpha$- position in the anthraquinone nucleus. The chloromethyl groups introduced by chloromethylation generally enter the aryl nucleus of the arylamino radicals, and the latter therefore include at least one unsubstituted reactive position. The number of chloromethyl groups introduced per molecule or arylaminoanthraquinone depends on the reaction conditions, such as temperature, concentration and duration, upon the number and nature of the arylamino groups present in the molecule, and upon the position and nature of nuclear substituents therein. In general, 1 to 2 chloromethyl groups are introduced into each arylamino radical, and 1 to 6, or preferably 1 to 4, chloromethyl groups are present in the resulting chloromethylated product.

The anthraquinone nucleus of the chloromethylated arylaminoanthraquinone compounds serving as intermediates for the products of this invention can be unsubstituted by groups other than arylamino radicals, or can contain additional substituents such as lower alkyl (e. g. methyl, ethyl), lower alkoxy (e. g. methoxy, ethoxy), halogen (e. g. chlorine, bromine), hydroxyl, primary amino, or secondary or tertiary alkylamino (e. g. methylamino, ethylamino, hydroxyethylamino, dimethylamino, diethylamino, bis-hydroxyethylamino, methyl hydroxyethylamino) groups, at least one of such substituents preferably occupying an $\alpha$- position.

The aryl radicals of the arylamino groups in the aforesaid intermediates, while preferably monocyclic, can be polycyclic. Thus, the aryl radicals can be of the benzene, biphenyl, diphenylmethane, naphthalene, anthracene or phenanthrene series. They can be free of substituents other than the anthraquinonylamino group and the chloromethyl groups introduced by chloromethylation, or they can be further substituted in one or more nuclear positions by substituents such as lower alkyl (e. g. methyl, ethyl), lower alkoxy (e. g. methoxy, ethoxy), halogen (e. g. chlorine, bromine), acylamino (e. g. form-amino, acetamino, benzamino), or tertiary amino (e. g. dimethylamino, diethylamino, methyl hydroxyethylamino, bis - hydroxyethylamino) groups. The aforesaid additional substituents which can be present in the anthraquinone nucleus and/or in the aryl nucleus of the arylamino radicals are of the type which are unreactive under conditions of chloromethylation, and which are also unreactive toward the chloromethylated derivatives formed by chloromethylating treatment, and do not include acidic water-solubilizing groups such as sulfonic or carboxylic acid groups.

The monocyclic phenols employed for the preparation of the compounds of this invention include mono- and polyhydric phenols (e. g. phenol, resorcinol, catechol, hydroquinone, phloroglucinol) and nuclear substituted products thereof which contain, for example, halogen (e. g. chlorine, bromine), alkyl (e. g. methyl, ethyl, octyl, isooctyl, dodecyl), or alkoxy (e. g. ethoxy, methoxy) groups. Such additional substituents, if present in the phenols, are oriented so as to leave at least one of the positions ortho- and para- to an hydroxyl group unsubstituted. As in the case of the arylaminoanthraquinone intermediates, the monocyclic phenols contain no acidic water-solubilizing groups.

In accordance with the invention, the condensation of the aforesaid chloromethylated arylaminoanthraquinones with the monocyclic phenols results in replacement of the chlorine contained in the chloromethyl groups by an hydroxy monocyclic-aryl radical, with elimination of hydrogen chloride. The products of the invention are thus hydroxy - monocyclic - aryl - methyl-arylaminoanthraquinones in which the hydroxyl group is in one of the positions ortho- and para- to the methyl group, the amino group is preferably joined to the anthraquinone nucleus in α- position, and the arylamino group is preferably monocyclic, said compounds being free of additional nuclear substituents or containing the substituents in the respective nuclei indicated above to be suitable in the intermediate compounds.

Despite the absence of an alkylation catalyst such as zinc chloride, the reaction according to this invention proceeds smoothly and yields a product of high purity. When phenols containing several reactive nuclear positions are employed, condensation with the chloromethyl intermediate unexpectedly occurs in only one of the positions of the phenolic nucleus.

The preparation of the products in accordance with this invention is illustrated in the following examples, wherein parts and percentages are by weight.

Example 1

20 parts of 1,4-bis-(chloromethyl-p-toluidino)-anthraquinone (prepared according to Example 4 of our aforesaid copending application, by reaction of 1,4-di-p-toluidinoanthraquinone with bis-chloromethyl ether in concentrated sulfuric acid at 30 to 32° C.) were mixed with 150 parts of phenol, and the mixture slowly heated to 158° C. The reaction mixture was maintained at the latter temperature for about two hours. Evolution of hydrogen chloride, which was initially observed at about 120° C., had ceased at the end of the aforesaid period. The mixture was diluted with 300 parts of 50% aqueous ethanol, and the precipitate thereby formed was recovered by filtration, washed and dried. The product thus recovered was a green powder, soluble in ethanol and acetone, and yielded green solutions of high tinctorial strength in these solvents. Its formula was as follows:

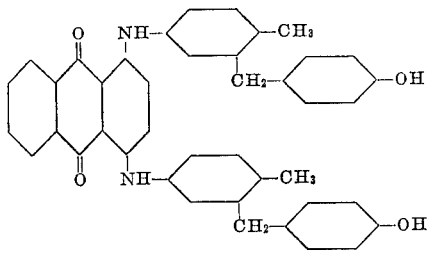

Example 2

10 parts of the intermediate chloromethylation product of Example 1 were dissolved in 50 parts of molten resorcinol at 120° C. The temperature was maintained at 130° C. for one hour, at the end of which period reaction was complete. Upon adding 150 parts of water and stirring, a green precipitate was formed which was filtered out and washed with water to remove excess resorcinol. The green powder thus obtained was very soluble in methanol with intense green coloration, and practically insoluble in benzene and carbon tetrachloride. Its formula was as follows:

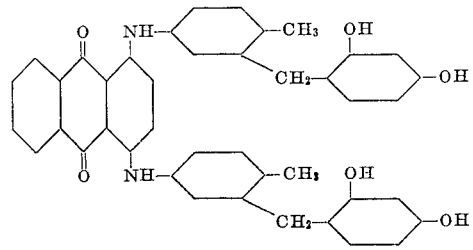

Example 3

16.5 parts of the intermediate chloromethylated ditoluidinoanthraquinone of Example 1 were heated with 100 parts of p-isooctyl phenol for two hours at 180° C. The reaction product was recovered from the mixture in the same manner as in Example 1. The product was likewise a green powder insoluble in water, benzene or carbon tetrachloride, but soluble in methanol with intense coloration. Its formula was as follows:

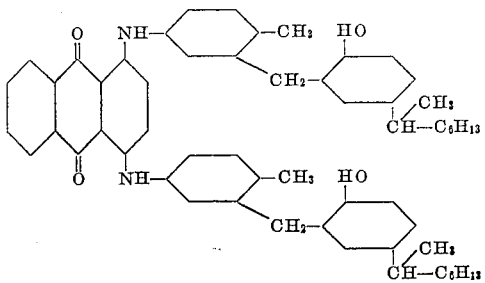

Example 4

13.5 parts of 4-(monochloromethyl - p - toluidino) - 1 - methylaminoanthraquinone (obtained according to Example 6 of our aforesaid copending application, by reaction of 4-p-toluidino-1-methylaminoanthraquinone with bis-chloromethyl ether in concentrated sulfuric acid at 30° to 32° C.) were mixed with 150 parts of phenol and heated, while stirring, at 130° C. for one hour. The temperature was then raised to 160° C. and maintained at this value for two hours. Evolution of hydrogen chloride had ceased at the end of this period and the mixture was cooled to 100° C. 100 parts of water were added, and unreacted phenol was removed from the mixture by steam distillation. The water-insoluble reaction product remaining in the distilland was filtered out and dried. It was a greenish-blue powder, soluble in lower alcohols, whereas the starting material and the parent 1-methyamino-4-p-toluidinoanthraquinone possessed very slight solubility in these solvents. The formula of the product was as follows:

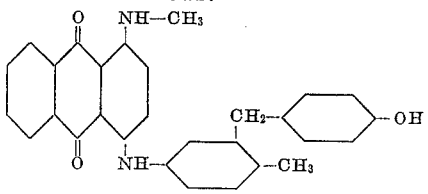

*Example 5*

13 parts of the intermediate employed in the foregoing example and 150 parts of resorcinol were heated, while stirring, at 120° C. for two hours, at which time hydrogen chloride evolution had ceased. The mixture was allowed to cool to 100° C. and poured, while stirring, into 2000 parts of water. The resulting precipitate was filtered out, washed and dried. The product was a greenish-blue powder, readily soluble in methanol and practically insoluble in carbon tetrachloride. A stable aqueous dispersion of this product in an aqueous solution of a dispersing agent yielded a greenish-blue shade of excellent fastness to washing, upon dyeing a cellulose acetate textile fabric with the dispersion. The formula of the product was as follows:

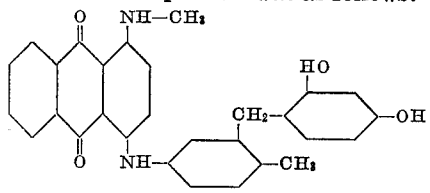

*Example 6*

10 parts of 1-hydroxy-4-(monochloromethyl-p-toluidino)-anthraquinone (prepared as described in Example 3 of the aforesaid copending application) was heated with 150 parts of phenol at 120° C. for one hour and at 140° C. for two hours. The reaction mixture was then cooled to 100° C. and poured into 2000 parts of water. After allowing the insoluble material to settle, and decanting the aqueous liquid therefrom, the former was steam distilled until residual phenol was removed. The water-insoluble product recovered from the distilland by filtration, was a bluish-violet powder of good solubility in methanol and ethanol. Its formula was as follows:

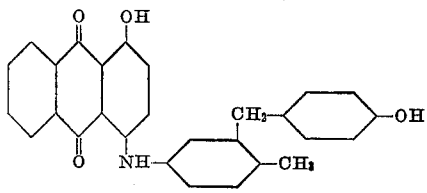

Similar products were obtained by procedures described in the foregoing examples, employing the following reagents:

| Chloromethylated Arylaminoanthraquinone | Phenolic Reagent | Procedure of— |
|---|---|---|
| 1-(bis-chloromethyl-p-toluidino)-anthraquinone. | Phenol | Example 4. |
| Do | Resorcinol | Example 5. |
| 4-hydroxy-1-(monochloromethylanilino)-anthraquinone. | Phenol | Example 6. |
| 1,4-bis-(chloromethyl-p-toluidino)-anthraquinone. | ___do___ | Example 1. |
| 1,5-bis-(chloromethyl-p-toluidino)-anthraquinone. | ___do___ | Do. |

As in the case of the other phenol condensation products, the products obtained by the aforesaid substitutions of reagents were soluble in methanol, ethanol, and acetone to form solutions exhibiting strong colorations, and substantially insoluble in benzene, carbon tetrachloride, petroleum dry cleaning solvent, and water.

Other chloromethylated arylaminoanthraquinones suitable as intermediates in the process of this invention are those in which the arylamino radical is a chloromethyl-substituted m-xylidino, -p-chloroanilino, -p-anisidino, -α- or -β-naphthylamino, -p-benzylanilino, or -p-phenylanilino radical. The proportion of phenol employed in the condensation can vary widely as indicated in the foregoing examples. An amount in excess of 1 mol of phenol per stoichiometric equivalent of a chloromethyl group in the chloromethylated anthraquinone is used, although a relatively large excess is preferred, particularly from 5 to 15 parts by weight of phenol per part by weight of chloromethylated arylaminoanthraquinone.

The products produced in accordance with the invention can be incorporated as coloring agents in cellulose nitrate and cellulose acetate lacquers having a ketone or alcohol as the solvent vehicle. They can also be incorporated in molding compositions of similar cellulose ester plastics. When dispersed in an aqueous solution of a dispersing agent, in the manner customary for application of water-insoluble dyestuffs for the dyeing of cellulose ester textile materials, the treatment of the cellulose ester textile material in the resulting dye bath yields colorations of outstanding depth, brilliance and fastness to washing and dry cleaning.

Variations and modifications, which will be obvious to those skilled in the art, can be made in the specific compositions and procedures herein described without departing from the scope or spirit of the invention.

We claim:

1. A dyestuff soluble in low molecular weight alcohols and ketones and substantially insoluble in hydrocarbons, chlorinated hydrocarbons and water, said dyestuff being an hydroxy-monocyclic-aryl-methyl-arylamino-substituted anthraquinone, wherein the remaining positions of the anthraquinone nucleus are occupied by members of the group consisting of hydrogen, halogen, lower alkyl, lower alkoxy, hydroxyl, primary amino, and secondary and tertiary alkylamino groups, wherein the aryl radical of the arylamino group is of the class consisting of benzene, biphenyl, diphenylmethane, naphthalene, anthracene, and phenanthrene radicals, and nuclear halo, lower alkyl, lower alkoxy, acylamino, and tertiary amino-substituted derivatives thereof, and wherein the monocyclic hydroxyl-aryl group is a radical of a member of the group consisting of monoand polyhydric phenols and their nuclear halo, alkyl, and alkoxy derivatives.

2. A green anthraquinone dyestuff having the following formula:

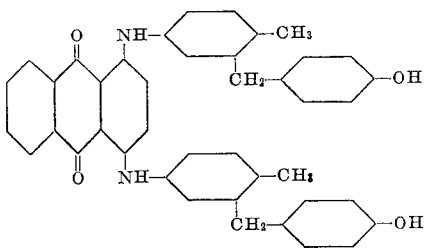

3. A process for the preparation of anthraquinone dyestuffs, soluble in lower alcohols and ketones but substantially insoluble in water and hydrocarbons, which consists in heating, in the absence of other reagents, a mixture of a chloromethylated arylaminoanthraquinone containing no acidic water-solubilizing substituents, with a monocyclic phenol containing no acidic water-solubilizing substituents and having at least one of the positions ortho and para to an hydroxyl group unsubstituted, at a temperature from 100° to 200° C., until evolution of hydrogen chloride is substantially complete.

4. A process as described in claim 3, wherein the amount of monocyclic phenol is 5 to 15 times the weight of the chloromethylated arylaminoanthraquinone.

5. A process for the preparation of anthraquinone dyestuffs, soluble in lower alcohols and ketones but substantially insoluble in water and hydrocarbons, which consists in heating, in the absence of other reagents, a mixture of a chloromethylated α - monocyclic - arylamino - anthraquinone containing no acidic water-solubilizing groups, with a monocyclic phenol containing no acidic water-solubilizing substituents and having at least one of the positions ortho and para to an hydroxyl group unsubstituted, at a temperature from 100° to 200° C., until evolution of hydrogen chloride is substantially complete.

6. A process for the preparation of anthraquinone dyestuffs, soluble in lower alcohols and ketones but substantially insoluble in water and hydrocarbons, which consists in heating, in the absence of other reagents, a mixture of a chloromethylated arylaminoanthraquinone, wherein the remaining positions of the anthraquinone nucleus are occupied by members of the group consisting of hydrogen, halogen, lower alkyl, lower alkoxy, hydroxyl, primary amino, and secondary and tertiary alkylamino groups, wherein the aryl radical of the arylamino group is of the class consisting of benzene, biphenyl, diphenylmethane, naphthalene, anthracene, and phenanthrene radicals and nuclear halo, lower alkyl, lower alkoxy, acylamino, and tertiary aminosubstituted derivatives thereof, with a member of the group consisting of monocyclic mono- and polyhydric phenols and their nuclear halo, alkyl, and alkoxy derivatives, having at least one of the positions ortho and para to an hydroxyl group unsubstituted, at a temperature from 100° to 200° C., until evolution of hydrogen chloride is substantially complete.

7. A process for preparing a green anthraquinone dyestuff, soluble in lower alcohols and ketones but insoluble in water and hydrocarbons, which consists in heating, in the absence of other reagents, 1,4-bis-(chloromethyl-p-toluidino)-anthraquinone with 5 to 15 parts of phenol, at a temperature of 100° to 200° C., until evolution of hydrogen chloride is substantially complete, and separating the resulting condensation product from the excess phenol.

References Cited in the file of this patent

UNITED STATES PATENTS

| Number | Name | Date |
|---|---|---|
| 1,998,546 | Kranzlein et al. | Apr. 23, 1933 |